United States Patent
Mahmoudi et al.

(10) Patent No.: US 11,499,116 B2
(45) Date of Patent: Nov. 15, 2022

(54) FRICTION REDUCING POLYELECTROLYTE COATING

(71) Applicant: United Technologies Corporation, Farmington, CT (US)

(72) Inventors: Seyed Reza Mahmoudi, Manchester, CT (US); Catalin G. Fotache, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 219 days.

(21) Appl. No.: 16/717,549

(22) Filed: Dec. 17, 2019

(65) Prior Publication Data

US 2021/0179962 A1    Jun. 17, 2021

(51) Int. Cl.
| | | |
|---|---|---|
| C10M 149/14 | (2006.01) | |
| C10M 145/14 | (2006.01) | |
| F16C 33/66 | (2006.01) | |
| C10N 40/02 | (2006.01) | |

(52) U.S. Cl.
CPC ........ *C10M 149/14* (2013.01); *C10M 145/14* (2013.01); *F16C 33/6696* (2013.01); *C10M 2209/084* (2013.01); *C10M 2217/041* (2013.01); *C10N 2040/02* (2013.01)

(58) Field of Classification Search
CPC ................ F16C 33/201; F16C 33/6648; F16C 33/6696; F16C 33/206; F16C 33/208; F16C 2223/30; F16C 2360/23; F16C 17/02; F16C 2202/30; F16C 2208/40; F16C 2202/02; Y02T 10/86; C10M 145/14; C10M 149/14; C10M 2217/041; C10M 2209/084; C10N 2040/02
See application file for complete search history.

(56) References Cited

U.S. PATENT DOCUMENTS

| | | |
|---|---|---|
| 3,591,468 A | 7/1971 | Nishio |
| 8,999,906 B2 | 4/2015 | Bongaerts |
| 2011/0177987 A1 | 7/2011 | Lenting et al. |

FOREIGN PATENT DOCUMENTS

| | | |
|---|---|---|
| EP | 1956072 | 8/2008 |
| WO | 1993020775 | 10/1993 |

OTHER PUBLICATIONS

Extended European Search Report for EP Application No. 20213570.3 dated May 18, 2021.

*Primary Examiner* — Vishal V Vasisth
(74) *Attorney, Agent, or Firm* — Carlson, Gaskey & Olds, P.C.

(57) ABSTRACT

A low friction coated article includes a first structure that has a first lubricated surface coated with a first polyelectrolyte coating. A second structure has a second lubricated surface with a second polyelectrolyte coating opposite the first lubricated surface. The first and second polyelectrolyte coatings include alternating layers of positively charged polyelectrolyte layers and negatively charged polyelectrolyte layers hydrated with a lubricant.

20 Claims, 2 Drawing Sheets

FRICTION REDUCING POLYELECTROLYTE COATING

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Gas turbine engines includes many components that require lubrication to reduce heat generation and wear on the components. For example, journal bearings require contacts with low friction. However, during acceleration of a shaft relative to a journal bearing, there is a period of time where the shaft may not levitate as the hydrodynamic force generated in the lubricant is too small. During this period before the shaft is levitated from the hydrodynamic force of the lubricant, there is increased contact and wear between the bearing and the shaft.

SUMMARY

In one exemplary embodiment, a low friction coated article includes a first structure that has a first lubricated surface coated with a first polyelectrolyte coating. A second structure has a second lubricated surface with a second polyelectrolyte coating opposite the first lubricated surface. The first and second polyelectrolyte coatings include alternating layers of positively charged polyelectrolyte layers and negatively charged polyelectrolyte layers hydrated with a lubricant.

In a further embodiment of any of the above, the first and second polyelectrolyte coatings include one of the positively charged polyelectrolyte layers adjacent each of the first and second lubricated surfaces.

In a further embodiment of any of the above, the first and second polyelectrolyte coatings include N number of the positively charged polyelectrolyte layers and N−1 number of the negatively charged polyelectrolyte layers.

In a further embodiment of any of the above, N equals 6.

In a further embodiment of any of the above, an outer most layer of the first and second polyelectrolyte coatings includes one of the positively charged polyelectrolyte layers.

In a further embodiment of any of the above, at least one of the first and second polyelectrolyte coatings are macroscopically filled with lubricant.

In a further embodiment of any of the above, a coefficient of friction between the first coating and the second coating is less than 0.01.

In a further embodiment of any of the above, a coefficient of friction between the first coating and the second coating is less than 0.001.

In a further embodiment of any of the above, the positively charged polyelectrolyte layers include layers of a PEI material.

In a further embodiment of any of the above, the negatively charged polyelectrolyte layers include layers of a PAA material.

In a further embodiment of any of the above, the article includes one of a journal bearing, a ball bearing, or a roller bearing.

In another exemplary embodiment, a method of coating an article with a low friction coating includes applying a polyelectrolyte coating to a lubricated surface on a structure. The polyelectrolyte coating includes at least one positively charged polyelectrolyte layer adjacent at least one negatively charged polyelectrolyte layer. A liquid is dehydrated from the polyelectrolyte coating. The polyelectrolyte coating dehydrated from the liquid is filed with a lubricant.

In a further embodiment of any of the above, the at least one positively charged polyelectrolyte layer includes a plurality of positively charged polyelectrolyte layers. The at least one negatively charged polyelectrolyte layer includes a plurality of negatively charged polyelectrolyte layers. Applying the polyelectrolyte coating includes applying the plurality of positive polyelectrolyte layers in an alternating pattern with the plurality of negatively charged polyelectrolyte layers.

In a further embodiment of any of the above, the polyelectrolyte coating includes N number of the positively charged polyelectrolyte layers and N−1 number of the negatively charged layers. One of the plurality of positively charged polyelectrolyte layers is located directly adjacent the lubricated surface on the structure.

In a further embodiment of any of the above, N equals 6.

In a further embodiment of any of the above, an outer most layer of the polyelectrolyte coating includes one of the plurality of positively charged polyelectrolyte layers.

In a further embodiment of any of the above, the plurality of positively charged polyelectrolyte layers and the plurality of negatively charged polyelectrolyte layers repel each other upon the application of a contact force to the polyelectrolyte coating.

In a further embodiment of any of the above, applying the polyelectrolyte coating includes attaching at least one of water, ionic liquid, or liquid salt molecules to the plurality of positively charged polyelectrolyte layers and the plurality of negatively charged polyelectrolyte layers.

In a further embodiment of any of the above, the plurality of positively charged polyelectrolyte layers include a PEI material. The plurality of negatively charged polyelectrolyte layers include a PAA material.

In a further embodiment of any of the above, the article includes one of a journal bearing, a ball bearing, or a roller bearing.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
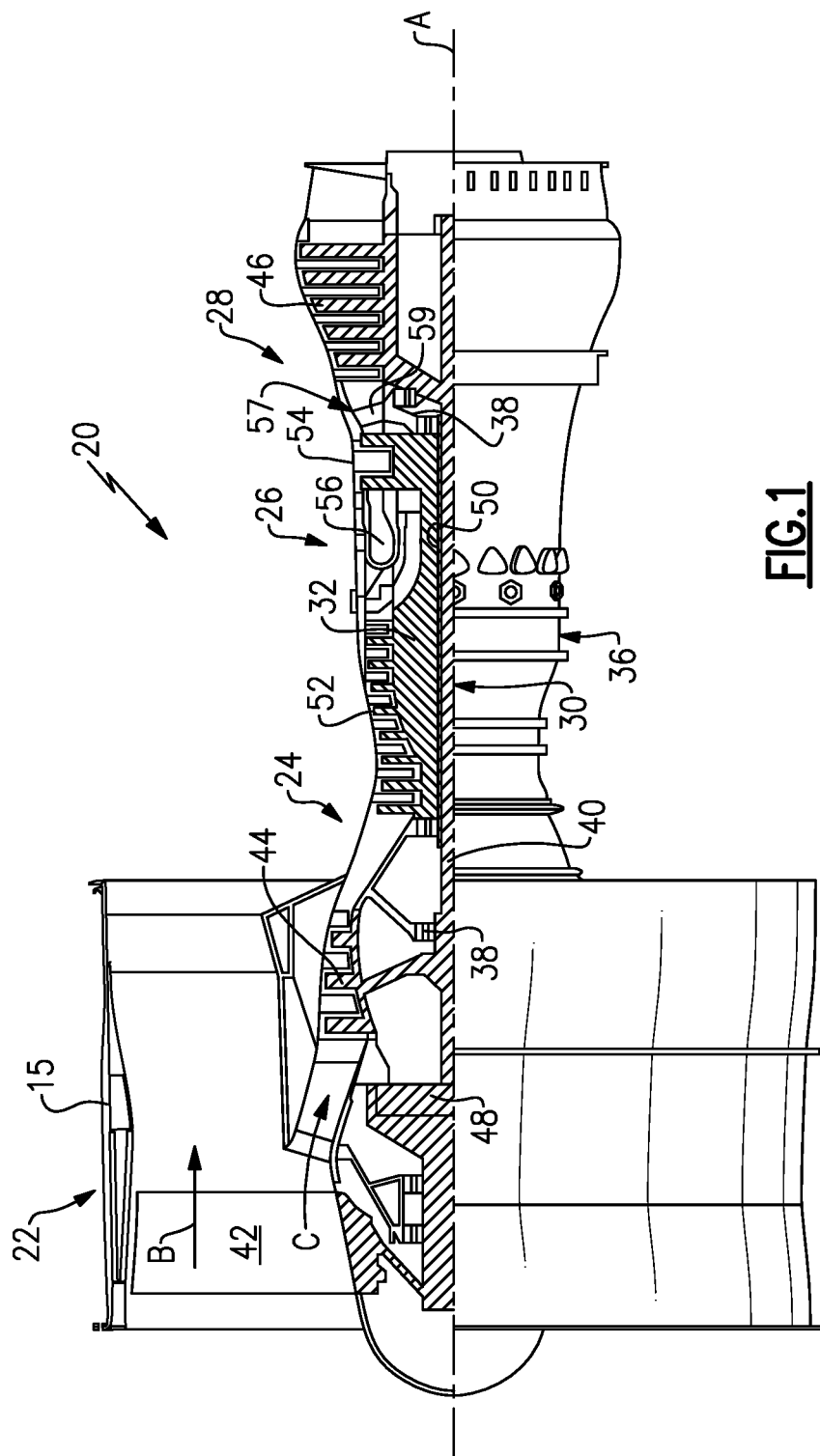
FIG. 1 is a schematic view of an example gas turbine engine according to a non-limiting example.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15, such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
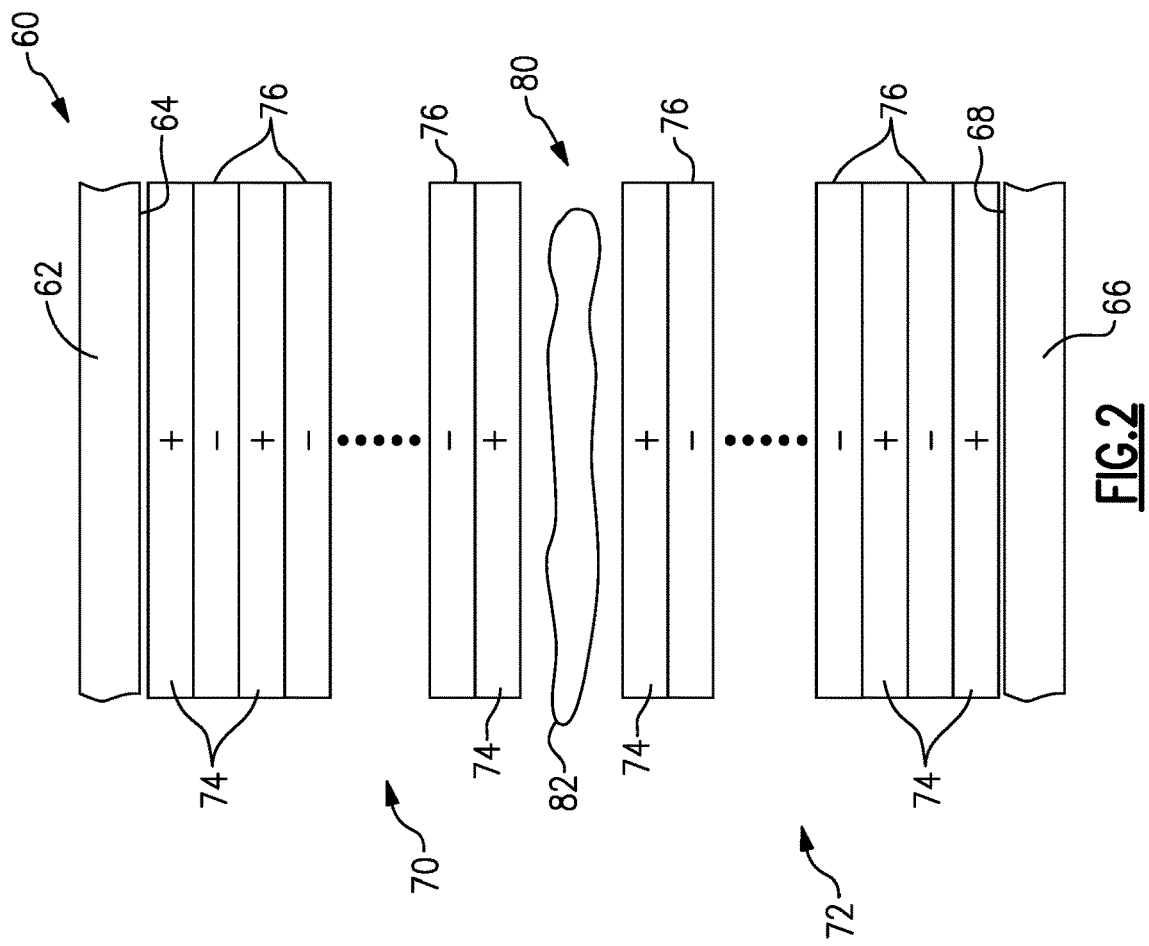
FIG. 2 is a cross-sectional view of an example article with a polyelectrolyte coating.

FIG. 2 illustrates a cross-sectional view of an example article 60 used in the gas turbine engine 20. The article 60 could include any article in the gas turbine engine 20 that has relative movement between adjacent structures, such as in journal bearings, roller bearings, ball bearings, or other types of bearings used in the bearing systems 38 or the geared architecture 48. Although the article 60 is illustrated in the context of the gas turbine engine 20, the article 60 could be used in connection with other environments, such as automotive environments, where a reduction in frictional contact forces is desired.

In the illustrated example, the article 60 includes a first structure 62 having a first lubricated surface 64 and a second structure 66 having a second lubricated surface 68. One of the first and second structures 62, 66 may be fixed relative to a reference point while the other moves or both the first and second structures 62, 66 may move relative to the reference point, such as the static structure 36 of the gas turbine engine 20.

A first polyelectrolyte coating 70 is attached to the first lubricated surface 64 and a second polyelectrolyte coating 72 is attached to the second lubricated surface 68 opposite the first polyelectrolyte coating 70. In the illustrated example, at least one of the first and second lubricated surfaces 64, 68 includes a rough surface having asperities. In one example, the rough surface includes a surface finish of approximately 0.280 Ra and a surface roughness of approximately 4.90 μm.

The first and second polyelectrolyte coatings 70, 72 are formed from positively charged polyelectrolyte layers 74, such as Polyethyleneimine ("PEI") layers, arrange in an alternating stacked pattern with negative polyelectrolyte layers 76, such as Polyacrylic Acid ("PAA") layers. The opposite charge between the positively charged layers 74 and the negatively charged layers 76 creates a repulsive force between the positively charged layers 74 and the negatively charged layers 76 when a contact force between the first and second structures 62, 66 is applied. The repulsive force further reduces friction and wear between the first and second structures 62, 66 before a lubricant can properly condition the space between the first and second structures 62, 66.

In the illustrated example, an innermost layer and an outermost layer of the first and second polyelectrolyte coatings 70, 72 include one of the PEI layers 74. This configuration results in there being a greater number of positively charged layers 74 than negatively charged layers 76 with opposite sides of each of the negatively charged layers 76 being in contact with a corresponding one of the PEI layers 74. For example, when there are N number of positively charged layers 74 in either of the first or second polyelectrolyte coatings 70, 22, the number of negatively charged layers 76 in either the first or second polyelectrolyte coatings 70, 72 is N−1, respectively. Therefore, when N equals six, there are six positively charged layers 74, five negatively charged layers 76, and a total of eleven layers forming the first or second polyelectrolyte coating 70, 72. However, N could be greater or less than six for purposes of this disclosure. Additionally, for purposes of this disclosure, a layer is differentiated from another layer based on a change in material such that a grouping a similar material constitutes a single layer unless it is separated by another material.

As further shown in FIG. 2, a contact interface 80 is located between an outermost layer of the first and second polyelectrolyte coatings 70, 72. During an initial movement between the first structure 62 and the second structure 66, a lubricant 82 may not create sufficient hydrodynamic levitation forces to reduce or eliminate contact between the first and second structures 62, 66. Generally, it is during this period of reduced hydrodynamic levitation forces that the first and second structures 62, 66 create the most wear and generate the most heat. After sufficient hydrodynamic levitation forces have been generated in the lubricant as the result of relative movement between the first and second structures 62, 66, the concern of contact and wear between the first and second structures 62, 66 is reduced or eliminated. Therefore, the first and second polyelectrolyte coatings 70, 72 have little to no contribution to friction reduction as sufficient hydrodynamic forces were generated.

One feature of the first and second polyelectrolyte coatings 70, 72 is a reduction in the amount of wear and heat generated between the first and second structures 62, 66 through a reduction in a coefficient of friction. The reduction in the coefficient of friction between the first and second structures 62, 66 that results from utilizing the first and second polyelectrolyte coatings 70, 72, can reach levels of super-lubricity. For example, the coefficient of friction between the first and second structures 62, 66 can reach levels less than 0.01 in one example, or even less than 0.001 in another example.

Figure 3:
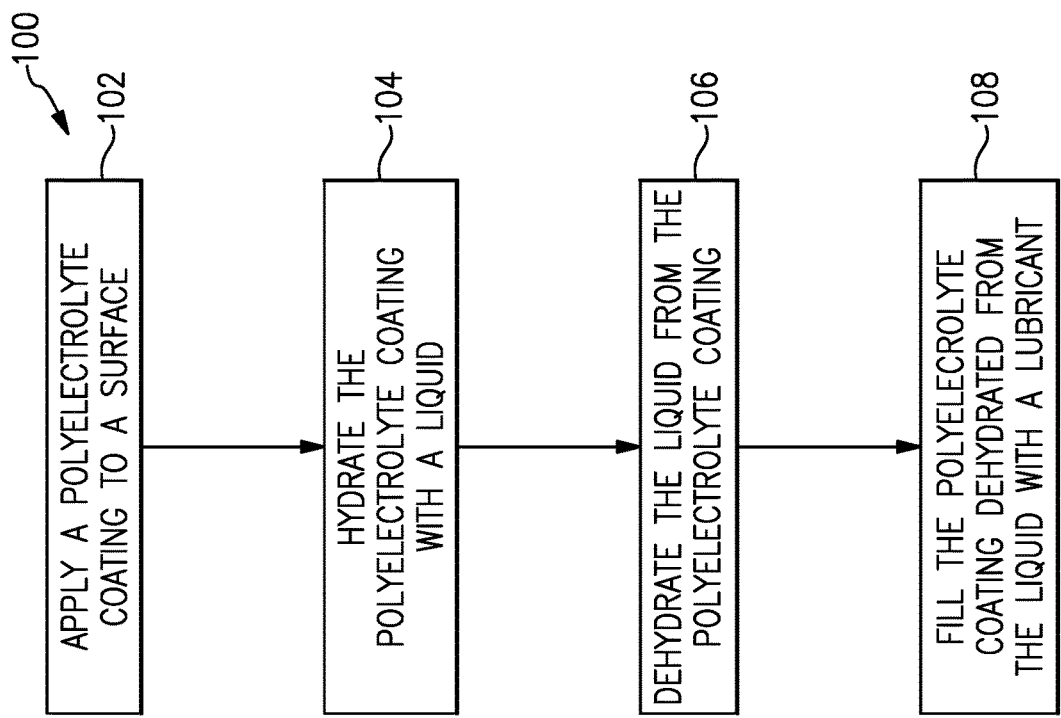
FIG. 3 is an example method of coating the article with the polyelectrolyte coating.

FIG. 3 illustrates an example method 100 or process of applying a polyelectrolyte coating to an article to achieve the levels of super-lubricity described above. The polyelectrolyte coating for the method 100 may be either the first or second polyelectrolyte coating 70, 72 and the article may be either the first or second structures 62, 66.

The method 100 includes applying the polyelectrolyte coating 70, 72 to the structure 62, 66 with at least one positively charged layer 74 and at least one negatively charged layer 76 (Step 102). Additionally, the least one positively charged and negatively charged layer 74, 76 could include a plurality of positively charged and negatively charged layers 74, 76 arranged in an alternating pattern as described above. In an example, one of the positively charged layers 74 is applied to the structure 62, 66 as an innermost layer of the polyelectrolyte coating 70, 72 with or without a bonding agent located between the positively charged layer 74 and the structure 62, 66. Conversely, the outermost layer of the polyelectrolyte coatings 70, 72 is also one of the positively charged layers 74.

During the application of the positively charged and negatively charged layers 74, 76 to the structure 62, 66, the positively charged and negatively charged layers 74, 76 are hydrated with a liquid, such as water, ionic liquids, or liquid salts (Step 104). The hydration of the positively charged and negatively charged layers 74, 76 with the liquid includes attaching the liquid molecules to the positively charged and negatively charged layers 74, 76.

After the positively charged and negatively charged layers 74, 76 are applied and hydrated, the liquid molecules are dehydrated from the layers 74, 76 (Step 106). Dehydrating the liquid molecules from the positively charged and negatively charged layers 74, 76 creates space within the positively charged and negatively charged layers 74, 76 to accept a lubricant, such as oil (Step 108). Filling the positively charged and negatively charged layers 74, 76 with lubricant further contributes to the reduction in the coefficient of friction that results from the polyelectrolyte coating 70, 72 as the lubricant with the polyelectrolyte coating 70, 72 further reduces wear and asperities that may results on the structures 62, 66.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A low friction coated article comprising:
    a first structure having a first lubricated surface coated with a first polyelectrolyte coating; and
    a second structure having a second lubricated surface with a second polyelectrolyte coating opposite the first lubricated surface;
    wherein the first and second polyelectrolyte coatings including alternating layers of positively charged polyelectrolyte layers and negatively charged polyelectrolyte layers both dehydrated from a liquid including water and hydrated with an oil based lubricant.

2. The low friction coated article of claim 1, wherein the first and second polyelectrolyte coatings include one of the positively charged polyelectrolyte layers adjacent each of the first and second lubricated surfaces.

3. The low friction coated article of claim 2, wherein the first and second polyelectrolyte coatings include N number of the positively charged polyelectrolyte layers and N−1 number of the negatively charged polyelectrolyte layers.

4. The low friction coated article of claim 3, wherein N equals 6.

5. The low friction coated article of claim 2, wherein an outer most layer of the first and second polyelectrolyte coatings includes one of the positively charged polyelectrolyte layers.

6. The low friction coated article of claim 1, wherein at least one of the first and second polyelectrolyte coatings are macroscopically filled with lubricant.

7. The low friction coated article of claim 1, wherein a coefficient of friction between the first coating and the second coating is less than 0.01, the positively charged polyelectrolyte layers include layers of a PEI material, and the negatively charged polyelectrolyte layers include layers of a PAA material.

8. The low friction coated article of claim 1, wherein a coefficient of friction between the first coating and the second coating is less than 0.001, the positively charged polyelectrolyte layers include layers of a PEI material, and the negatively charged polyelectrolyte layers include layers of a PAA material.

9. The low friction coated article of claim 1, wherein the positively charged polyelectrolyte layers include layers of a PEI material.

10. The low friction coated article of claim 1, wherein the negatively charged polyelectrolyte layers include layers of a PAA material.

11. The low friction coated article of claim 1, wherein the low friction coated article includes one of a journal bearing, a ball bearing, or a roller bearing.

12. A method of coating an article with a low friction coating, the method comprising:
applying a polyelectrolyte coating to a lubricated surface on a structure, wherein the polyelectrolyte coating includes at least one positively charged polyelectrolyte layer adjacent at least one negatively charged polyelectrolyte layer;
dehydrating a liquid including water from the polyelectrolyte coating; and
filling the polyelectrolyte coating dehydrated from the liquid with an oil based lubricant.

13. The method of claim 12, wherein the at least one positively charged polyelectrolyte layer includes a plurality of positively charged polyelectrolyte layers and the at least one negatively charged polyelectrolyte layer includes a plurality of negatively charged polyelectrolyte layers and applying the polyelectrolyte coating includes applying the plurality of positive polyelectrolyte layers in an alternating pattern with the plurality of negatively charged polyelectrolyte layers.

14. The method of claim 13, wherein the polyelectrolyte coating includes N number of the positively charged polyelectrolyte layers and N−1 number of the negatively charged layers and one of the plurality of positively charged polyelectrolyte layers is located directly adjacent the lubricated surface on the structure.

15. The method of claim 14, wherein N equals 6.

16. The method of claim 13, wherein an outer most layer of the polyelectrolyte coating includes one of the plurality of positively charged polyelectrolyte layers.

17. The method of claim 16, wherein the plurality of positively charged polyelectrolyte layers and the plurality of negatively charged polyelectrolyte layers repel each other upon the application of a contact force to the polyelectrolyte coating.

18. The method of claim 13, wherein applying the polyelectrolyte coating includes attaching at least one of water, ionic liquid, or liquid salt molecules to the plurality of positively charged polyelectrolyte layers and the plurality of negatively charged polyelectrolyte layers.

19. The method of claim 13, wherein the plurality of positively charged polyelectrolyte layers include a PEI material and the plurality of negatively charged polyelectrolyte layers include a PAA material.

20. The method of claim 12, wherein the article includes one of a journal bearing, a ball bearing, or a roller bearing.

* * * * *